United States Patent
Bar et al.

(10) Patent No.: US 9,785,695 B2
(45) Date of Patent: *Oct. 10, 2017

(54) PROVIDING MULTIPLE CONCURRENT TRANSACTIONS ON A SINGLE DATABASE SCHEMA USING A SINGLE CONCURRENT TRANSACTION DATABASE INFRASTRUCTURE

(71) Applicant: INTERNATIONAL BUSINESS MACHINES CORPORATION, Armonk, NY (US)

(72) Inventors: Oren Bar, Tel Aviv (IL); Itay Maoz, Haifa (IL); Vadim Stotland, Petah-Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,445

(22) Filed: Jun. 7, 2016

(65) Prior Publication Data
US 2016/0292257 A1   Oct. 6, 2016

Related U.S. Application Data

(63) Continuation of application No. 13/925,126, filed on Jun. 24, 2013, now Pat. No. 9,384,257.

(51) Int. Cl.
*G06F 17/00*   (2006.01)
*G06F 17/30*   (2006.01)

(52) U.S. Cl.
CPC .. *G06F 17/30595* (2013.01); *G06F 17/30362* (2013.01)

(58) Field of Classification Search
None
See application file for complete search history.

(56) References Cited

U.S. PATENT DOCUMENTS

| | | | | |
|---|---|---|---|---|
| 5,377,351 A | * | 12/1994 | Kotera | G06F 9/524 |
| 5,781,910 A | * | 7/1998 | Gostanian | G06F 17/30348 |
| | | | | 707/610 |
| 6,138,118 A | * | 10/2000 | Koppstein | G06F 9/466 |
| 6,598,140 B1 | | 7/2003 | McAllister et al. | |
| 6,681,226 B2 | * | 1/2004 | Bretl | G06F 17/30359 |
| | | | | 707/703 |
| 7,080,169 B2 | | 7/2006 | Tang et al. | |
| 7,246,123 B2 | | 7/2007 | Carr et al. | |
| 7,669,015 B2 | | 2/2010 | Dice et al. | |
| 7,707,195 B2 | * | 4/2010 | Nettleton | G06F 17/30008 |
| | | | | 707/704 |
| 7,979,408 B2 | * | 7/2011 | Nettleton | G06F 17/30008 |
| | | | | 707/613 |
| 8,028,133 B2 | | 9/2011 | Dice et al. | |

(Continued)

OTHER PUBLICATIONS

Leggieri et al, "Teaching Concurrency Control and Recovery in Relational Databases", 2009.*
Siberschatz et al., "Distributed Transactions," 2004 (35 pages).

*Primary Examiner* — Hung Le
(74) *Attorney, Agent, or Firm* — Griffiths & Seaton PLLC (57) ABSTRACT

Executing multiple concurrent transactions on the single database schema using a single concurrent transaction database infrastructure, wherein the single database schema is a single concurrent transactional relational database.

18 Claims, 6 Drawing Sheets

(56) References Cited

U.S. PATENT DOCUMENTS

| | | | |
|---|---|---|---|
| 8,341,128 B1* | 12/2012 | Ruggiero | G06F 17/30351 707/690 |
| 8,417,681 B1 | 4/2013 | Miloushev et al. | |
| 8,464,261 B2 | 6/2013 | Moir et al. | |
| 8,977,898 B1* | 3/2015 | Veeraswamy | G06F 17/30227 714/15 |
| 9,021,303 B1* | 4/2015 | DeSouter | G06F 11/1417 714/15 |
| 2002/0165724 A1 | 11/2002 | Blankesteijn | |
| 2004/0030703 A1 | 2/2004 | Bourbonnais et al. | |
| 2004/0088298 A1 | 5/2004 | Zou et al. | |
| 2004/0199549 A1* | 10/2004 | Oksanen | G06F 17/30348 |
| 2004/0236744 A1* | 11/2004 | Desai | G06F 17/30362 |
| 2005/0102554 A1* | 5/2005 | Zohar | G06F 11/2074 714/6.12 |
| 2005/0182795 A1 | 8/2005 | Murthy | |
| 2007/0198519 A1 | 8/2007 | Dice et al. | |
| 2007/0239943 A1* | 10/2007 | Dice | G06F 9/466 711/147 |
| 2008/0092139 A1 | 4/2008 | Ruby | |
| 2009/0037910 A1* | 2/2009 | Dantzig | G06Q 40/04 718/100 |
| 2011/0246993 A1 | 10/2011 | Moir et al. | |
| 2013/0110883 A1* | 5/2013 | Junqueira | G06F 17/30353 707/803 |
| 2013/0332435 A1* | 12/2013 | Bernstein | G06F 17/30584 707/703 |
| 2014/0236887 A1 | 8/2014 | Nelson et al. | |

\* cited by examiner

PROVIDING MULTIPLE CONCURRENT TRANSACTIONS ON A SINGLE DATABASE SCHEMA USING A SINGLE CONCURRENT TRANSACTION DATABASE INFRASTRUCTURE

CROSS REFERENCE TO RELATED APPLICATIONS

This Application is a Continuation of U.S. patent application Ser. No. 13/925,126, filed on Jun. 24, 2013.

BACKGROUND OF THE INVENTION

Field of the Invention

The present invention relates in general computing systems, and more particularly to providing multiple concurrent transactions on a single database schema using a single concurrent transaction database infrastructure.

Description of the Related Art

In today's society, computer systems are commonplace. Computer systems may be found in the workplace, at home, or at school. Computer systems may include data storage systems, or disk storage systems, to process and store data. Moreover, many computing systems use a database to store vast quantities of data for future retrieval upon request by a user. A user can be either an application program and/or an end user interacting with the database system through an input device. Relational databases are found virtually anywhere and almost in any software solution, such as in web servers, mobile phone platforms, and SAP solutions.

Related groups of data are commonly referred to as files of data, or tables, as commonly used in relational databases, which is a database in which all compound data objects are organized as columns and unordered rows. The rows of data in a table are referred to as logical records, and the columns of data are referred to as fields. In a relational database system, the user perceives the data only as tables, and not in any other organizational form, e.g. a hierarchical structure of data. As such, there is a need to provide an increase in efficiency of the relational database structure.

SUMMARY OF THE INVENTION

In one embodiment, a method is provided for efficient use of relational databases using at least one processor device in a computing environment. In one embodiment, by way of example only, the method comprises executing multiple concurrent transactions on the single database schema using a single concurrent transaction database infrastructure, wherein the single database schema is a single concurrent transactional relational database; calculating a plurality of parameters for controlling a tradeoff between at least each of concurrency, throughput, and latency; initializing a semaphore for controlling the plurality of concurrent transactions; and executing a plurality of concurrent transactions on the single database schema in parallel on the single database schema using the single concurrent transaction database infrastructure.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, many computing systems use a database to store vast quantities of data for future retrieval upon request by a user. A user can be either an application program and/or an end user interacting with the database system through an input device. Related groups of data are commonly referred to as files of data, or tables, as commonly used in relational databases, which is a database in which all compound data objects are organized as columns and unordered rows. The rows of data in a table are referred to as logical records, and the columns of data are referred to as fields. In a relational database system, the user perceives the data only as tables, and not in any other organizational form, e.g. a hierarchical structure of data. However, in one embodiment, relational databases may also double as, and this is one of their main advantages, transactional engines. They provide transactional access to the data stored, which include all-or-nothing approach, atomicity, rollbacks and commits.

In one embodiment, when a data usage model of data that is stored in a relational database is identified by frequent updates of single separate entries or by frequent additions of single entries, as in a case in metadata of file system objects or in metadata of virtual tape cartridges, the upper bound of the throughput of the system is bounded by the throughput of all concurrent operations on objects correspond to entries in the relational database. This still holds when the data usage model also includes relatively rare actions (as compared to the frequency of the actions above) on a bulk, and/or even on all of the entries, together. In one embodiment, several examples of this data usage model relevancy in real world applications are as follows. Example 1: Updating backup hosts' ports reservation information on a bulk of virtual tapes in a single virtual tape library. This may happen at the end of a business day, when the backup policy is just starting, and all the virtual tapes are being loaded at once to start all backup streams simultaneously. These are separate transactions, for each virtual tape, being received by the virtual tape library all at once. Example 2: Frequent changes to open files' attributes in a single file system. This can be done by as many application threads as possible, and/or all at once. On the contrary, an example of a rare action is the "list files" operation done by the system's operator, which queries the attributes of a bulk of objects as a single unified transaction, but happens quite rarely.

In one embodiment, in the rational databases, a solution may be provided for multiple concurrent transactions, such as IBM® relational model database DB2, Oracle®, and/or SQL® Server. However, there are several challenges for these relational databases, especially when being considered to provide the backbone of the metadata of an application or a system. For example, one challenge is a high usage of system resources, especially memory and CPU. This adds substantial hardware requirements for the application or the entire solution. These databases may be servers, running as a separate process, or even on a different machine. This has a communication overhead, in addition to increase of complexity of the solution and the ability to control its behavior. These databases have a complex configuration, setup and installation, especially when needed to be adapted to the specific application or solution, as optimal as possible to maximize the performance. Thus, these challenges are usually expensive and experience significant costs, and may not be suitable for every operating system or the storage application environment, and/or may not support active-active updates—(e.g., do not allow updating a persistent database on a shared file system in a few nodes cluster setup.

However, in one embodiment, there may be relational databases, which are in process and quite simple to use, with a controllable low memory footprint, which do not have the above stated drawbacks. However these databases have other challenges such as being limited to a single concurrent transaction. Thus, these challenges significantly reduce performance, depending on the data usage model, storage solutions for example. As such, there is a need to provide an increase in efficiency of the relational database structure.

In one embodiment, the present provides a solution for efficient use of relational databases using at least one processor device in a computing environment. In one embodiment, by way of example only, multiple concurrent transactions are executed on a single database schema using a single concurrent transaction database infrastructure. The single database schema is a single concurrent transactional relational database.

Figure 1:
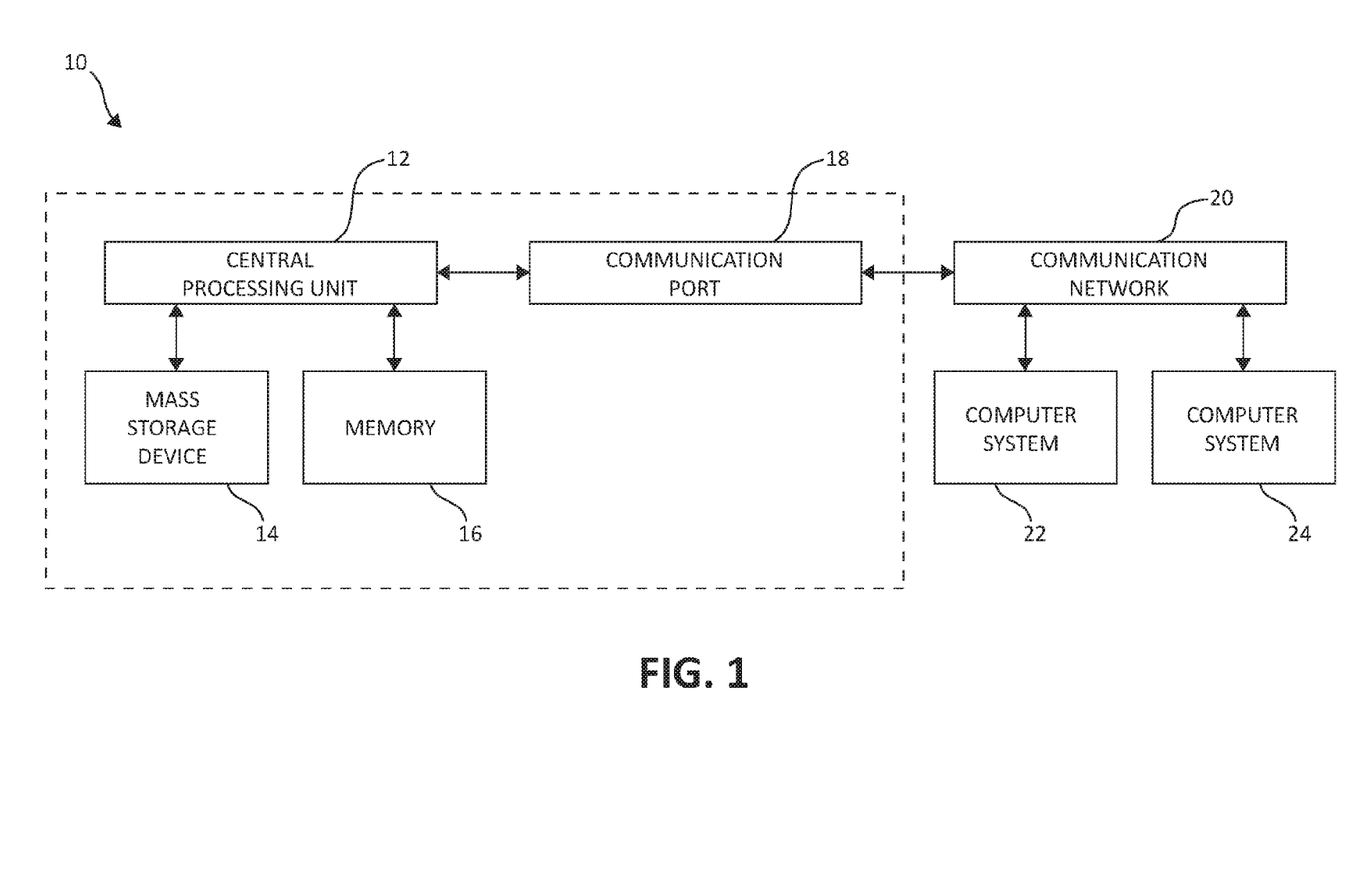
FIG. 1 illustrates is a block diagram showing an exemplary hardware structure for smoothing destaging tasks in which aspects of the present invention may be realized.

Turning to FIG. 1, a block diagram of one embodiment of a system 100 for smoothing destaging tasks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

Figure 2:
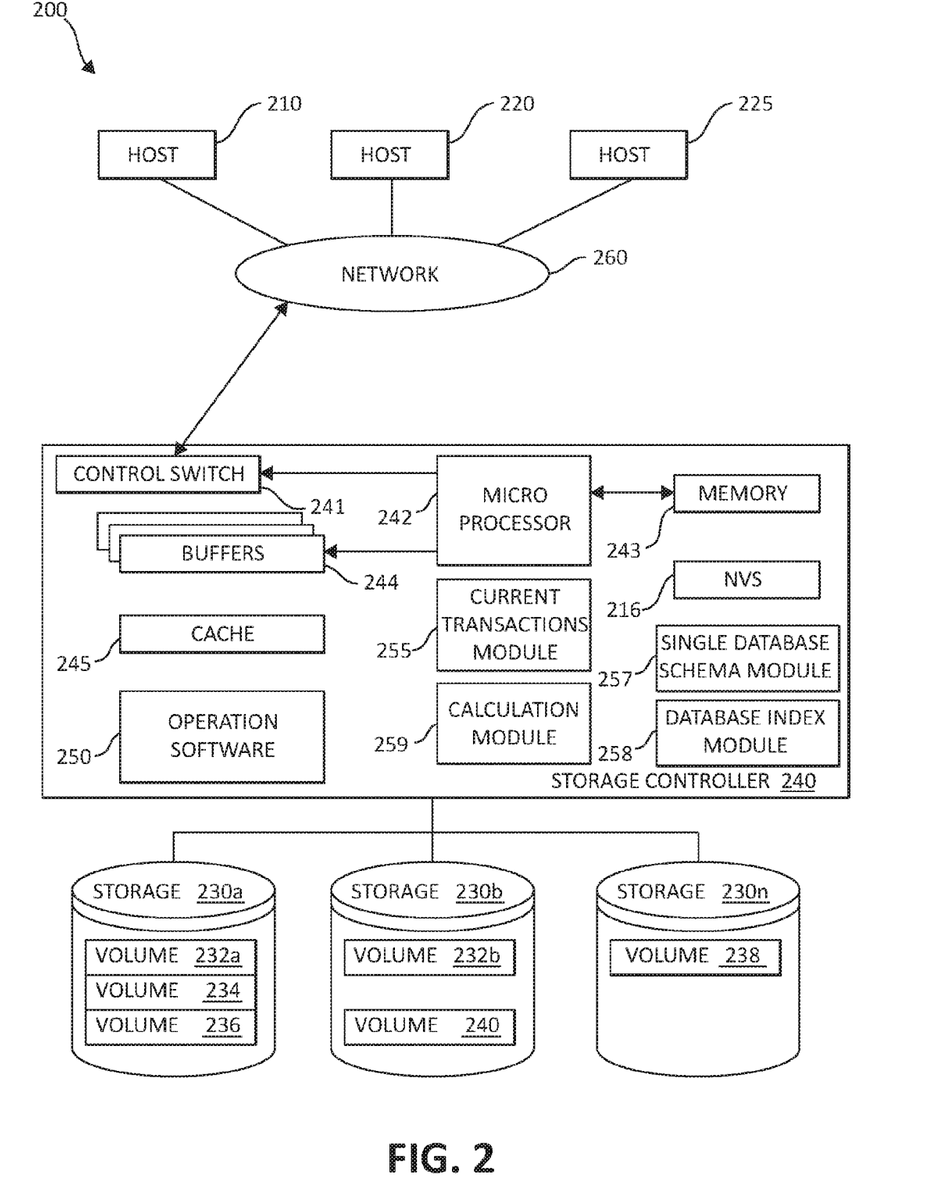
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a current transactions module 255, a single database schema module 257, a database index module 258, a calculation module 259 and the sequence numbers module 259 may be one complete module functioning simultaneously or separate modules. The current transactions module 255, the single database schema module 257, the database index module 258, and the calculation module 259 may have some internal memory (not shown) and may store unprocessed, processed, or "semi-processed" data. The current transactions module 255, the single database schema module 257, the database index module 258, and the calculation module 259 may work in conjunction with each and every component of the storage controller 240, the hosts 210, 220, 225, and other storage controllers 240 and hosts 210, 220, and 225 that may be remotely connected via the storage fabric 260. Both the current transactions module 255, the single database schema module 257, the database index module 258, and the calculation module 259 may be structurally one complete module or may be associated and/or included with other individual modules. The current transactions module 255, the single database schema module 257, the database index module 258, and the calculation module 259 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the current transactions module 255, the single database schema module 257, the database index module 258, and the calculation module 259 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the current transactions module 255, the single database schema module 257, the database index module 258, and the calculation module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
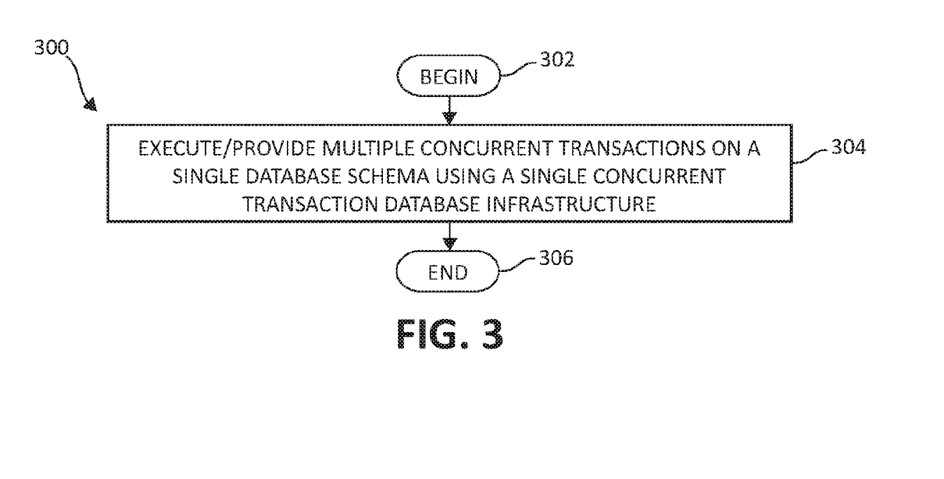
FIG. 3 is a flowchart illustrating an exemplary method for providing multiple concurrent transactions on a single database schema using a single concurrent transaction database infrastructure in which aspects of the present invention may be realized.

Turning to FIG. 3, a flowchart illustrates an exemplary method 300 for providing multiple concurrent transactions on a single database schema using a single concurrent transaction database infrastructure is depicted. The method 300 begins (step 302). The method 300 executes and/or provides multiple concurrent transactions on a single database schema using a single concurrent transaction database infrastructure (step 304). The single database schema may be a single concurrent transactional relational database. The method 300 ends (step 308).

Figure 4:
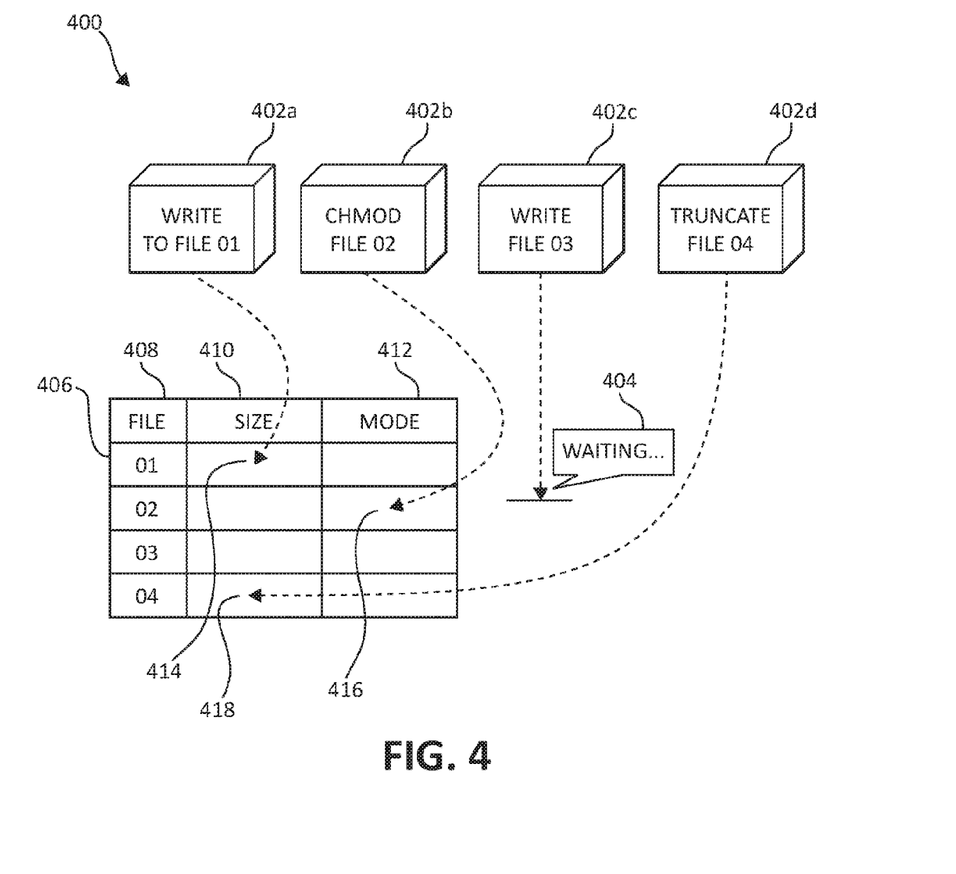
FIG. 4 is a block diagram showing an exemplary hardware structure of a database with a 3-concurrent-transactions limitation, which acts as the metadata table of a file system in which aspects of the present invention may be realized.

FIG. 4 is a block diagram showing an exemplary hardware structure 400 of a database with a 3-concurrent-transactions limitation, which acts as the metadata table of a file system in which aspects of the present invention may be realized. As illustrated, multiple concurrent transactions 402 (shown as 402A write operation to file 1, 402B, change/modification operation to file 2, 402C write operation to file 3, and/or 402D truncate operation for file 4). Related groups of data 406 include the files of data 408 (shown with file 1, file 2, file 3, and file 4), the size 410 of the file, and the mode 412. In one embodiment, the rows of data in the table 406 may be referred to as logical records, and the columns of data may be referred to as fields. In the relational database system 400, each table schema may identify a primary column used for identifying a row called the primary key. In one embodiment, tables can relate by using a foreign key that points to the primary key of another table. The relational model offers various levels of refinement of the table relations called database normalization. The database management system (DBMS) of a relational database is called a RDBMS, and is the software of a relational database.

As illustrated, the database, with a 3-concurrent-transactions limitation, acts as the metadata table of a file system. Here, the concurrent transactions of 402A-D are executed for 402A write operation to file 1 414, 402B, change/modification operation to file 2 416, and 402D truncate operation to file 4 418. However, because of a system limitation and challenges as described herein, the write operation 402C must wait for execution of the operation to file 3 418.

To overcome the limitations and challenges, as described herein, the present invention provides multiple concurrent transactions for single entry operations using a single concurrent transaction relational database (e.g., a $3^{rd}$ party single concurrent transaction relational database). In one embodiment, there are several databases, all having the exact same database schema, and the several databases are combined to expose a single database schema to be accessed from many threads running concurrent transactions. This operation is performed while maintaining the good traits of transactional behavior.

In one embodiment, the present invention avoids all the disadvantages (e.g. high usage of CPU and RAM, not active-active, complex installation and setup, etc.) of those database servers that do provide multiple concurrent transactions, but retain still this one very crucial advantage, multiple concurrent transactions, which is very important to the data usage model, as illustrated above in FIG. 4. It should be noted that using simple databases as infrastructure may also be the only viable solution for some products due to licensing or architecture restrictions.

Figure 5:
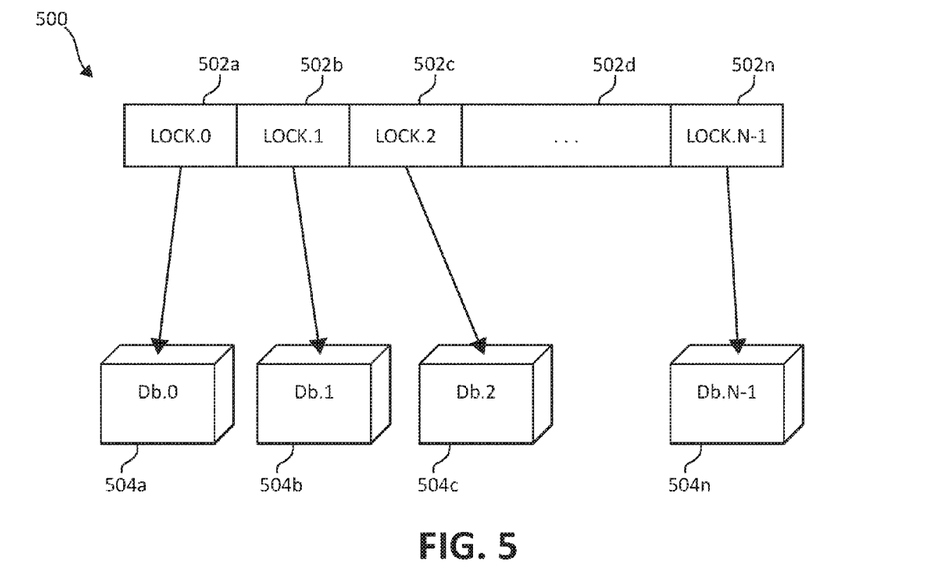
FIG. 5 is a block diagram showing an exemplary hardware structure of providing multiple concurrent transactions on a single database schema using a single concurrent transaction database infrastructure according to the present invention in which aspects of the present invention may be realized.

FIG. 5 is a block diagram showing an exemplary hardware structure 500 of providing multiple concurrent transactions on a single database schema using a single concurrent transaction database infrastructure according to the present invention in which aspects of the present invention may be realized. As illustrated in FIG. 5, building on top of N database files 504 (illustrated in FIG. 5 with 504A-N), the present invention guards each database 504 with one multiple-readers-single-writer lock 502 (illustrated in FIG. 5 with 502A-N). Each schema of a single database 504 will be of one identical schema. The difference between the data that will occupy each database 504A-N is that each database 504 will store a subset of the entries, according to their primary keys' values. This can be generalized by the following formula:

Given an entry key k, the database index that will hold this entry is $$MOD(HASH(k), N) \qquad (1),$$

where MOD is modulus, HASH is a hash value, k is the entry key, and N is the number of the databases being combined. HASH will be a function that produces a uniform distribution and a fair dispersion.

Figure 6:
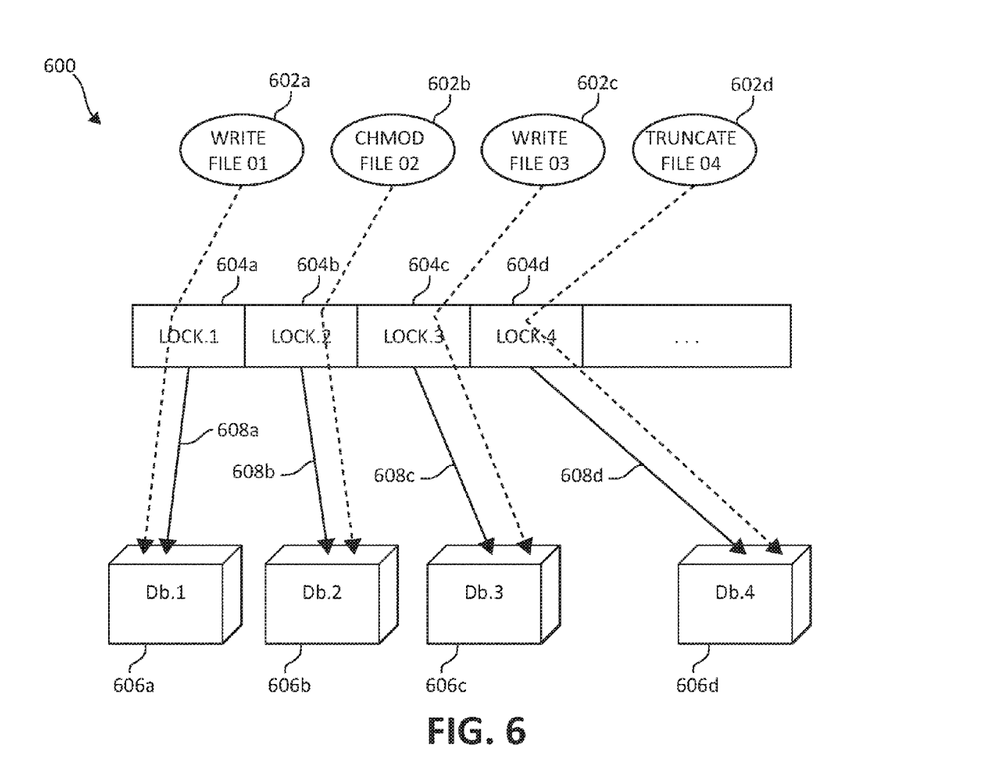
FIG. 6 is a block diagram showing an exemplary hardware structure of providing multiple concurrent transactions on a single database schema using a single concurrent transaction database infrastructure for the same database schema and usage shown in FIG. 4, by which aspects of the present invention may be realized.

FIG. 6 is a block diagram showing an exemplary hardware structure 600 of providing multiple concurrent transactions on a single database schema using a single concurrent transaction database infrastructure for the same database schema and usage shown in FIG. 4, by which aspects of the present invention may be realized. Based on the common usage model described above, the majority of the workload is done in single entry operations 602 (illustrated in FIG. 6 as 602A-D). When a single entry operation 602 is executed, the designated database index is calculated based on the formula above, MOD(HASH(k), N), and then the lock 604 (illustrated in FIG. 6 as 604A-D) of the same index is acquired. From here, the present invention is free to execute the same operation on the designated database 606 (illustrated in FIG. 6 as 606A-D).

Figure 7:
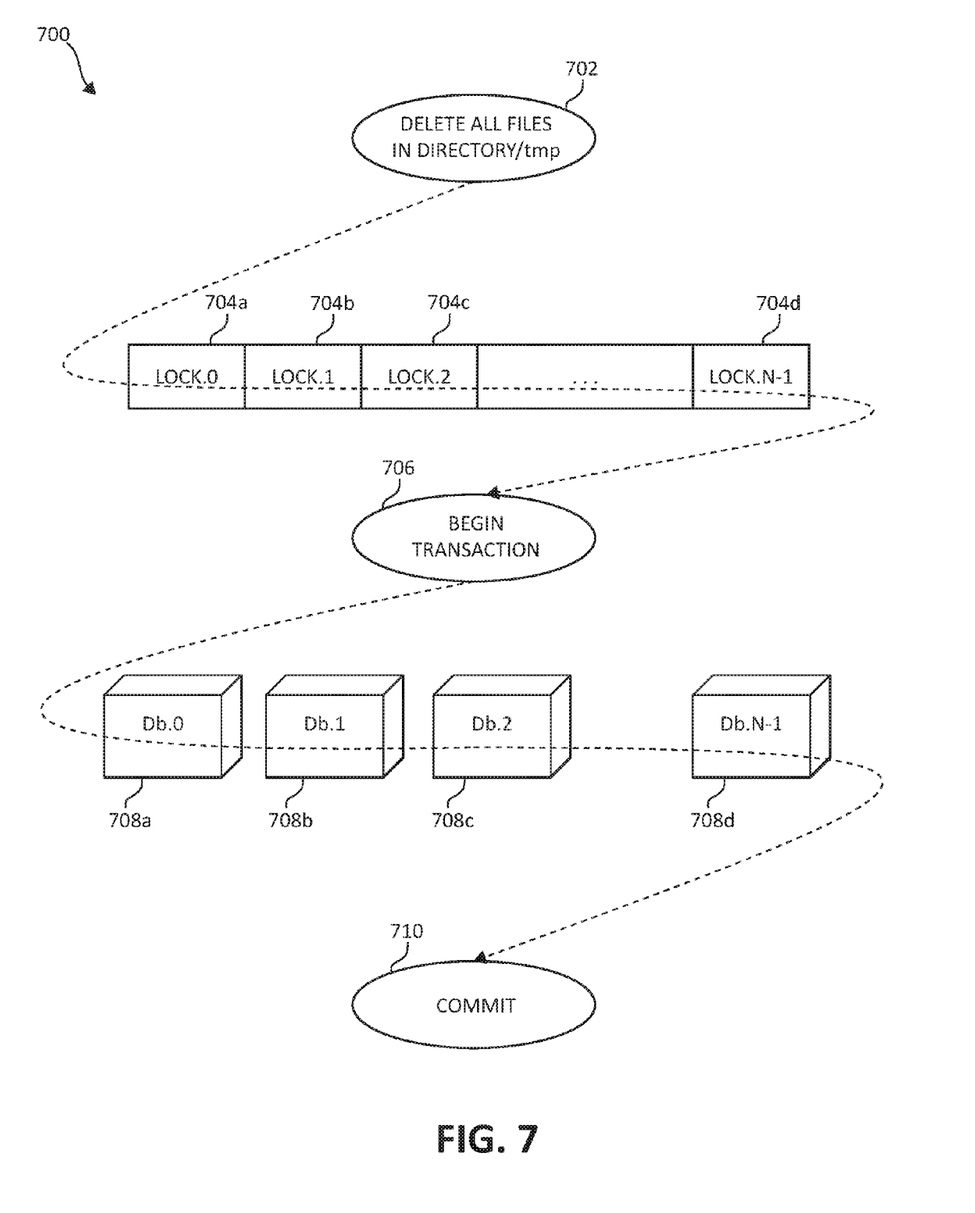
FIG. 7 is a block diagram showing an alternative use case using all underlying databases in one single transaction with a latency problem.

FIG. 7 is a block diagram showing an alternative use case 700 using all underlying databases in one single transaction with a latency problem. For operations that are executed on several entries 702, the present invention relies on a feature for relational database engines, which is the capability of attaching databases. This capability allows the present invention to initiate transactions on multiple databases 708 (illustrated in FIG. 7 as 708A-D) combined. For the operations that include several entries, the present invention attaches the relevant databases 708 (illustrated in FIG. 7 as 708A-D) according to those entries' keys. The number of attached databases, K, can be up to N attachments. When such operation 702 (e.g., delete all files in a directory and/or temporary directories "tmp") is executed, the present invention clone it to K exact operations to be executed on each database 708A-D inside a single unified transaction 706 (e.g., begin operation). In one embodiment, the present invention locks all the locks 704 (illustrated in FIG. 7 as 704A-D with Lock.0 704A, Lock.1 704B, Lock.3 704C . . . Lock.N−1 704D) in increasing order to prevent deadlocks with other operations, and then commits the transaction initiated in 706.

Figure 8:
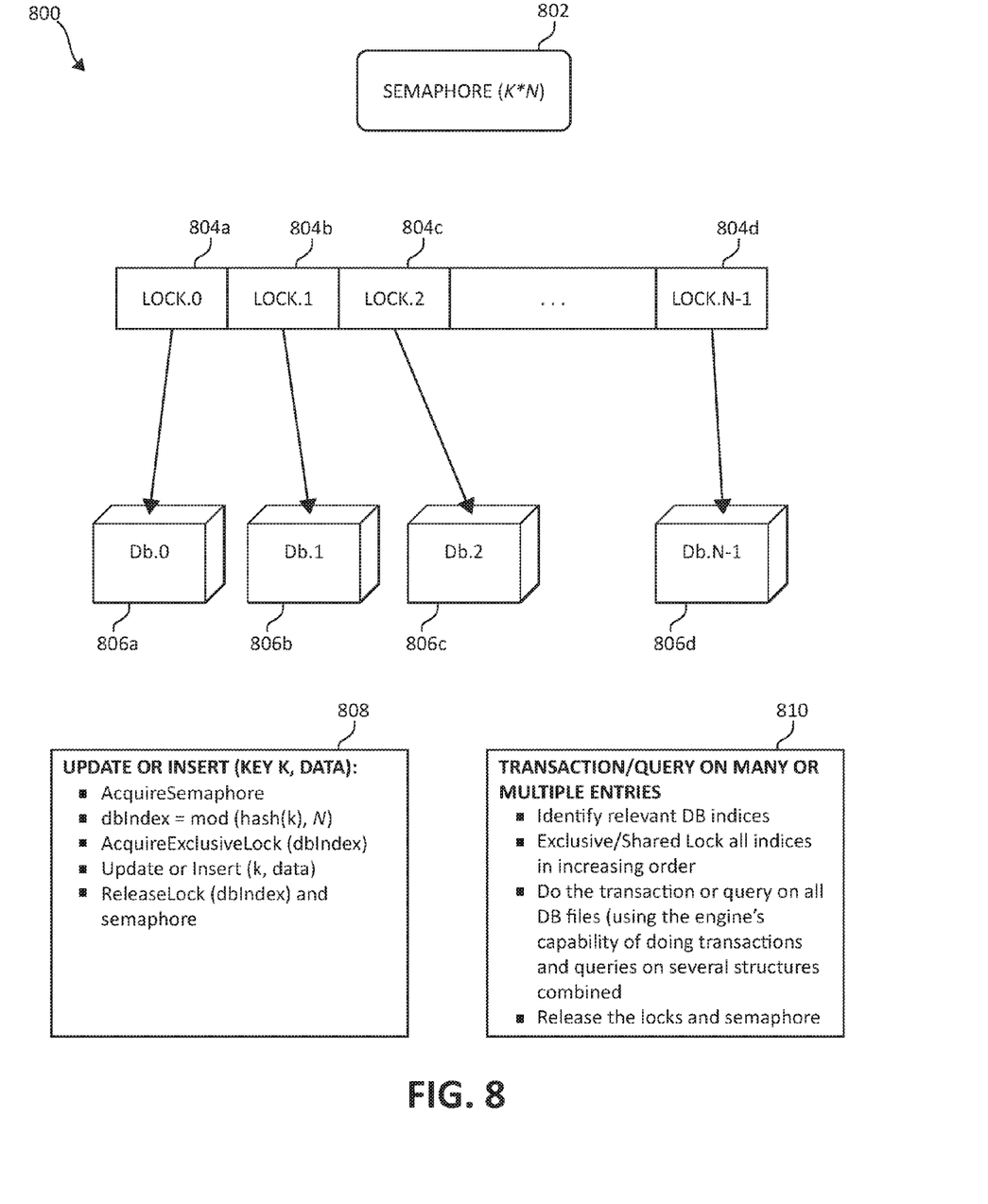
FIG. 8 is a block diagram showing an exemplary solution solving the latency problem in FIG. 7 by execution of multiple concurrent transactions on a single database schema using a single concurrent transaction database infrastructure according to the present invention in which aspects of the present invention may be realized.

FIG. 8 is a block diagram 800 showing an exemplary solution solving the latency problem in FIG. 7 by execution of multiple concurrent transactions on a single database schema using a single concurrent transaction database infrastructure according to the present invention in which aspects of the present invention may be realized. As illustrated in FIG. 8, building on top of N database files 806 (illustrated in FIG. 8 with 806A-D), the present invention guards each database 806 with one multiple-readers-single-writer lock 804 (illustrated in FIG. 5 with 502A-N and 504A-N). Each schema of a single database 806 will be of one identical schema. The difference between the data that will occupy each database 806A-D is that each database 806 will store a subset of the entries, according to their primary keys' values. The hierarchy of execution of multiple concurrent transactions on a single database schema using a single concurrent transaction database infrastructure according to the present invention, as shown in FIG. 8, is described below.

In one embodiment, by way of example only, it is assumed that a single entry operation takes u seconds. Assuming t is much greater than N (e.g., t>>N) where t is the number of threads trying to update the database (DB) schema with single entry operation. For example in one implementation of the present invention, t is 1024, and N is 20. The throughput of a single database is bounded by:

$$Th_{one\_db} = \frac{1}{u} \text{updates/sec}, \quad (2)$$

where $Th_{one\_db}$ is the throughput of one database and sec is seconds. Since t is much greater than N (e.g., t>>N), the throughput of the present invention is:

$$Th_{solution} = N * \frac{1}{u} \text{updates/sec} = N * Th_{one\_db}, \quad (3)$$

where $Th_{solution}$ is the throughput of the solution of the present invention. Since the size of each of the combined databases is 1/N of a single database (e.g., out of the box single database) that holds all the entries, the transactional engine is actually more efficient, so that for our solution's u is even shorter than the original u.

In one embodiment, the present invention decides what N will be, and depends on the parameters u and the required throughput:

$$Th_{required} = N * \frac{1}{u} \Rightarrow N = Th_{required} * u, \quad (4)$$

where $Th_{required}$ is the required throughput.

In one embodiment, the result will be multiplied by a factor, which will be greater than 1 (e.g., >1), since (1) u is given as an average, and the present invention needs to be able to sustain peaks. (2) Since the present invention cannot calculate the throughput of rare operations, such as user queries, the present invention adds a factor (e.g., factor) to overcome those and still supply the required throughput.

$$N = Th_{required} * u * \text{factor} \quad (5).$$

It is quite visible that there is a big tradeoff between the latency of K-databases (worst case K=N) query and the throughput the present invention can provide. Given an average query processing time on a single database q, the worst case query latency can be seen as:

$$\text{Latency}_{single\_db} = u * t + q \quad (6),$$

and this includes the time to wait for all the updating threads and the query processing time. In one embodiment, the larger N is the larger the throughput the present invention can provide, but that means that an N-databases query needs to compete with t threads since it locks the relevant locks sequentially (in increasing order).

In one embodiment, to deal with the latency issue, the present invention introduces another component to the solution. Each updating thread (of frequent update/insert operations) will first acquire a semaphore that is initialized to K*N, where K is much less than N (e.g., K<<N) and K*N is much less than t (e.g., K*N<<t). In one embodiment, a semaphore, as seen in FIG. 8 as 802, is a variable and/or abstract data type that provides a simple but useful abstraction for controlling access, by multiple processes, to a common resource in a parallel programming and/or a multi user environment.

In one embodiment, the semaphore enables only K*N writers at a time, making the worst case latency:

$$\text{Latency}_{solution} = u * K * N + q \quad (7),$$

assuming t is much greater than K*N (e.g., t>>K*N), the solution of the present invention decreases the maximum query latency time. Thus:

$$\text{Latency}_{solution} = u * K * N + q << u * t + q = \text{Latency}_{single\_db} \quad (8).$$

Thus, compared to a single-concurrent-transaction database engine, the present invention provides much higher throughput, concurrency, shorter latency, and flexibility in controlling parameters K and N. Based on the specific application or requirements, the present invention allow for controlling the tradeoff between concurrency, throughput and latency.

In one embodiment, as seen in FIG. 8, an update or insert operation 808 (key k, data) is observed and/or performed. In one embodiment, the present invention acquires a semaphore, and the database index (dbIndex) is a dbIndex that equals the formula MOD(HASH(k),N), and an exclusive lock is acquired for the database index, and an update or insert (k, data) is performed, and the lock of the database index and the semaphore are released.

In one embodiment, as seen in FIG. 8, a transaction and/or query operation 810 on one ore more multiple entries is shown. The present invention identifies relevant database (DB) indices, performs an exclusive and/or shared lock operation on all DB indices in an increasing order and determines if the transaction and/or query on all DB files (using the engine's capability of doing transactions and queries on several structures combined), and releases the locks.

In one embodiment, the present invention provides a solution for efficient use of relational databases using at least one processor device in a computing environment. In one embodiment, by way of example only, multiple concurrent transactions are executed on the single database schema using a single concurrent transaction database infrastructure. The single database schema is a single concurrent transactional relational database.

In one embodiment, the present invention combines multiple relational databases to expose the single database schema for providing a plurality of concurrent transactions on the single database schema using the single concurrent transactional relational database. The character traits and behaviors of a transactional relational database are maintained.

In one embodiment, the present invention stores a subset of entries according to primary key values for occupying data in each of the plurality of databases. Each of the databases has an identical single database schema.

In one embodiment, the present invention performs the workload for multiple single entry operations, calculates a database index when a single entry operation is executed and acquiring a lock of the database index. Upon acquiring the lock of the database index, and/or executes the single entry operation on a designed one of a designated one of the multiple databases.

In one embodiment, the present invention attaches an N number of the databases for initiating the multiple concurrent transactions on the single database schema for operations that are executed on the entries. In one embodiment, the present invention attaches an N number of the databases for executing a singular concurrent transaction across multiple entries. The alternative transactions and alternative queries are locked for the duration of the singular concurrent transaction In one embodiment, the present invention clones a single database operation for the multiple entries for performing identical operations on each one of the N number of the multiple databases in a single unified transaction. Each lock of each of the N number of the multiple databases are locked in an increasing order to prevent deadlocks with other operations. Also, a semaphore is initialized for controlling the multiple concurrent transactions. It should be noted that after the calculation of parameters, the present invention knows what N and K should be. The semaphore is initialized with K*N, thus controlling the multiple concurrent transactions.

In one embodiment, the present invention calculates parameters for controlling a tradeoff between at least each of concurrency, throughput, and latency, acquires a semaphore that initializes at least one of the parameters for updating threads of each of the multiple concurrent transactions for controlling the latency, and executes multiple concurrent transactions on the single database schema in parallel on the single database schema using the single concurrent transaction database infrastructure.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficient use of a relational database by a processor device in a computing environment, the method comprising:
    executing a plurality of concurrent transactions on the single database schema using a single concurrent transaction database infrastructure, wherein the single database schema is a single concurrent transactional relational database;
    calculating a plurality of parameters for controlling a tradeoff between at least each of concurrency, throughput, and latency;
    initializing a semaphore for controlling the plurality of concurrent transactions; and
    executing a plurality of concurrent transactions on the single database schema in parallel on the single database schema using the single concurrent transaction database infrastructure.

2. The method of claim 1, further including combing a plurality of databases to expose the single database schema for providing a plurality of concurrent transactions on the single database schema using the single concurrent transactional relational database, wherein character traits and behaviors of a transactional relational database are maintained.

3. The method of claim 1, further including storing a subset of a plurality of entries according to primary key values for occupying data in each of the plurality of databases, wherein each of the plurality of databases have an identical single database schema.

4. The method of claim 3, further including performing one of:
    performing workload for a plurality of single entry operations,
    calculating a database index when a single entry operation is executed and acquiring a lock of the database index, wherein upon acquiring the lock of the database index:
        executing the single entry operation on a designed one of a designated one of a plurality of databases.

5. The method of claim 2, further including attaching an N number of the plurality of databases for executing a singular concurrent transaction across a plurality of entries, wherein alternative transactions and alternative queries are locked for the duration of the singular concurrent transaction.

6. The method of claim 5, further including cloning a single database operation for the plurality of entries for performing identical operations on each one of the N number of the plurality of databases in a single unified transaction, wherein each lock of each of the N number of the plurality of databases are locked in an increasing order to prevent deadlocks with other operations.

7. A system for efficient use of a relational database in a computing environment, the system comprising:
    a plurality of databases, wherein the plurality of databases are relational databases; and
    at least one processor device in association with the plurality of databases and operable in the computing environment, wherein processor device:
        executes a plurality of concurrent transactions on a single database schema using the single concurrent transaction database infrastructure, wherein the single database schema is a single concurrent transactional relational database,
        calculates a plurality of parameters for controlling a tradeoff between at least each of concurrency, throughput, and latency,
        initializes a semaphore for controlling the plurality of concurrent transactions, and
        executes a plurality of concurrent transactions on the single database schema in parallel on the single database schema using the single concurrent transaction database infrastructure.

8. The system of claim 7, wherein the at least one processor device combines a plurality of databases to expose the single database schema for providing a plurality of concurrent transactions on the single database schema using the single concurrent transactional relational database, wherein character traits and behaviors of a transactional relational database are maintained.

9. The system of claim 8, wherein the at least one processor device stores a subset of a plurality of entries according to primary key values for occupying data in each of the plurality of databases, wherein each of the plurality of databases have an identical single database schema.

10. The system of claim 9, wherein the at least one processor device performs one of:
    performing workload for a plurality of single entry operations,
    calculating a database index when a single entry operation is executed and acquiring a lock of the database index, wherein upon acquiring the lock of the database index:
        executing the single entry operation on a designed one of a designated one of a plurality of databases.

11. The system of claim 8, wherein the at least one processor device attaches an N number of the plurality of databases for executing a singular concurrent transaction across a plurality of entries, wherein alternative transactions and alternative queries are locked for the duration of the singular concurrent transaction.

12. The system of claim 11, wherein the at least one processor device clones a single database operation for the plurality of entries for performing identical operations on each one of the N number of the plurality of databases in a single unified transaction, wherein each lock of each of the N number of the plurality of databases are locked in an increasing order to prevent deadlocks with other operations.

13. A computer program product for efficient use of relational databases in a computing environment by at least one processor device, the computer program product comprising a non-transitory computer-readable storage medium having computer-readable program code portions stored therein, the computer-readable program code portions comprising:
    an executable portion that executes a plurality of concurrent transactions on the single database schema using a single concurrent transaction database infrastructure, wherein the single database schema is a single concurrent transactional relational database;
    an executable portion that calculates a plurality of parameters for controlling a tradeoff between at least each of concurrency, throughput, and latency;

an executable portion that initializes a semaphore for controlling the plurality of concurrent transactions; and an executable portion that executes a plurality of concurrent transactions on the single database schema in parallel on the single database schema using the single concurrent transaction database infrastructure.

14. The computer program product of claim 13, further including an executable portion that combines a plurality of databases to expose the single database schema for providing a plurality of concurrent transactions on the single database schema using the single concurrent transactional relational database, wherein character traits and behaviors of a transactional relational database are maintained.

15. The computer program product of claim 13, further including an executable portion that stores a subset of a plurality of entries according to primary key values for occupying data in each of the plurality of databases, wherein each of the plurality of databases have an identical single database schema.

16. The computer program product of claim 15, further including an executable portion that performs one of:

performing workload for a plurality of single entry operations, calculating a database index when a single entry operation is executed and acquiring a lock of the database index, wherein upon acquiring the lock of the database index:
executing the single entry operation on a designed one of a designated one of a plurality of databases.

17. The computer program product of claim 14, further including an executable portion that attaches an N number of the plurality of databases for executing a singular concurrent transaction across a plurality of entries, wherein alternative transactions and alternative queries are locked for the duration of the singular concurrent transaction.

18. The computer program product of claim 17, further including an executable portion that clones a single database operation for the plurality of entries for performing identical operations on each one of the N number of the plurality of databases in a single unified transaction, wherein each lock of each of the N number of the plurality of databases are locked in an increasing order to prevent deadlocks with other operations.

* * * * *